July 7, 1970    KAZUO HAYASHI    3,518,765
DENTAL HANDPIECE

Filed Sept. 15, 1967    2 Sheets-Sheet 1

KAZUO HAYASHI
INVENTOR

BY Christensen,
Sanborn & Matthews
ATTORNEY

July 7, 1970  KAZUO HAYASHI  3,518,765
DENTAL HANDPIECE

Filed Sept. 15, 1967  2 Sheets-Sheet 2

KAZUO HAYASHI
INVENTOR

BY Christensen,
Sanborn & Matthews
ATTORNEY

United States Patent Office 3,518,765
Patented July 7, 1970

3,518,765
DENTAL HANDPIECE
Kazuo Hayashi, 376 Higomachi, Fushimi-ku, Kyoto, Japan
Filed Sept. 15, 1967, Ser. No. 668,313
Claims priority, application Japan, June 26, 1967, 42/40,865
Int. Cl. A61c 1/08
U.S. Cl. 32—26                          4 Claims

ABSTRACT OF THE DISCLOSURE

A dental handpiece having means to change dental tools such as drills quickly and easily. The handpiece comprises a hollow cylindrical body and a tubular member releasably connected to the body. The body has a portion of its bore eccentric with respect to the outer circumferential surface of the tubular member. A collar is rotatably disposed within the eccentric bore portion and carries an inner circumferential surface concentric with the tubular member. The collar is constructed and arranged so that relative rotation between the cylindrical body and the first tubular member causes the collar to securely but releasably fasten the tubular member to the interior of the cylindrical body. Relative rotation in the opposite direction releases the collar permitting separation of the body and tubular member.

---

This invention relates to a dental handpiece and more particularly to the mechanism for supporting a dental tool such as a drill, which is capable of quick connection and disconnection of the tool to and from the handpiece.

A single dental handpiece may be selectively provided with a different tool for a different purpose of dental treatment. The more quickly the tool secured to the handpiece can be replaced by a different tool, the more convenient it will be. In one known type of handpiece, a recess or projection is formed in the body of the handpiece so as to be engageable with a corresponding projection or recess formed on a dental tool, and for connection of the two members, they must be relatively rotated to grope for the point where the projection on one of them can be fitted into the recess in the other. The manipulation certainly is troublesome and replacement of tools requires much time.

Accordingly, the primary object of the invention is to provide a dental tool supporting mechanism for use in a dental handpiece, in which mere insertion of a tool into the handpiece body accompanied by a single twist of the tool relative to the handpiece body or vice versa suffices for connection or disconnection of the two members.

The invention will be explained hereinafter with reference to the accompanying drawings, in which.

Figure 1:
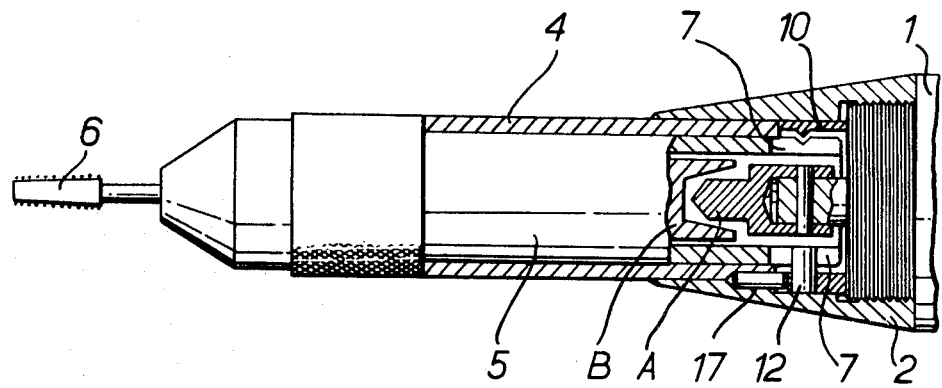
FIG. 1 is a side view, partly in vertical section, of one embodiment of the invention.

Referring now in detail to the drawings, there is shown a body 1 of a dental handpiece having an outer connection tube 2 threaded as at 3 to the forward end of the body 1. An inner connection tube 4 has its rear end inserted into the outer tube 2 to be secured thereto. A support tube 5 is adapted to be inserted into the outer tube 4 and rotatably support a dental tool 6 such as a drill. For replacement of the tool, the inner tube 5 with the tool 6 is pulled out of the outer tube 4, and the tube 5 with a different tool is inserted into the tube 4 to be secured to the handpiece by the mechanism and in the manner to be described hereinafter.

Figure 2:
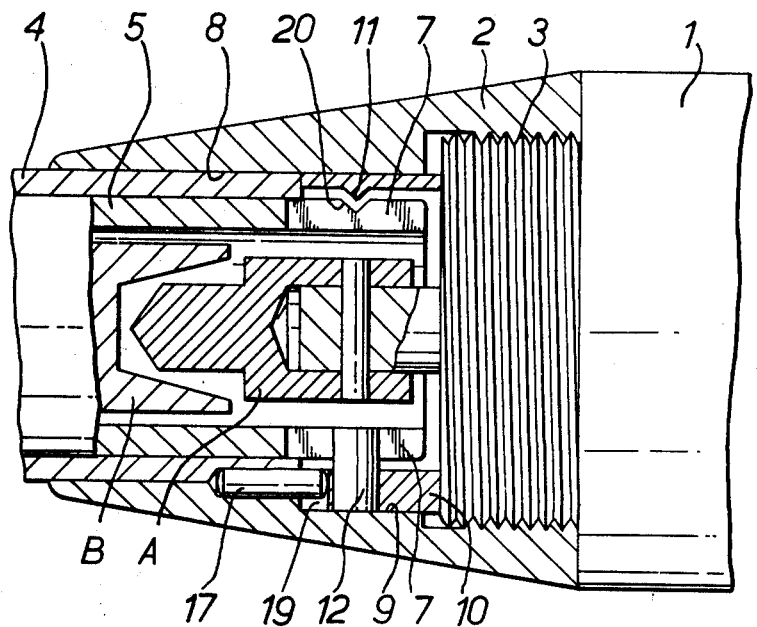
FIG. 2 is an enlarged view of the principal portion of FIG. 1.
Figure 3:
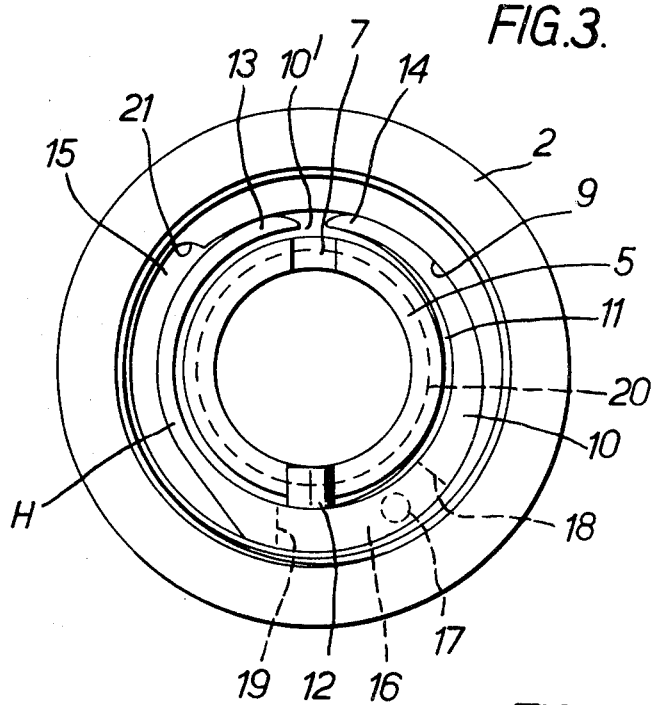
FIG. 3 is an end view of FIG. 2 as viewed from the right-hand side thereof, with the body of the handpiece removed for clarity of illustration.
Figure 4:
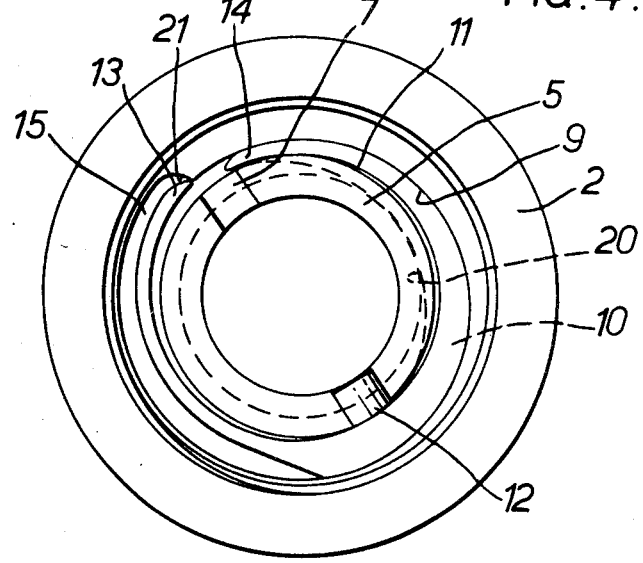
FIG. 4 is a view similar to FIG. 3, showing some of the component parts displaced from their respective positions in FIG. 3.

The support tube 5 has its rear end wall provided with a pair of diametrically opposed, axially extending slots 7. The axial bore 8 of the tube 2 has its rear end portion (right-hand side portion as viewed in FIG. 2) formed into a bore portion 9 of a larger diameter, with its center displaced from the center of the bore portion 8. In other words, the bore portion 9 is eccentric with respect to the bore portion 8. A collar 10 is disposed within this bore portion 9 and is rotatable therein. More than half the circumference of the outer wall of the collar 10 conforms to the inner wall of the bore portion 9, while the inner wall thereof is circular in cross section, with its center coinciding with the center of the bore portion 8. A projection 11 circumferentially extends part of the inner surface of the collar 10. A radially inwardly projecting pin 12 is rigidly planted on the inner surface of the collar 10. The collar 10 has its circumferential wall axially slotted as at 10' to form opposed edge portions 13 and 14. The collar 10 is made of a suitable resilient material and its tendency to expand radially outwardly is prevented by its contact with the inner wall of the bore portion 9. A recess 15 is formed in the inner wall of the bore 9, so that as the collar 10 is turned inside the bore portion 9, the edge portion 13 thereof is engaged in the recess 15. For easiness of engagement and disengagement of the edge portion 13 into and out of the recess 15, the collar 10 has a portion H of its wall adjacent the edge portion 13 made thinner than elsewhere. A recess 16 is formed on the left-hand (in FIG. 2) end surface of the collar. A pin 17 axially projects from the right-hand end of the inner tube 4 into the recess 16, as shown in FIG. 2, so that as the collar 10 is turned relative to the tube 2 in the manner to be described below, the pin 17 hits against either one of the two opposite faces 18 and 19 which define the recess 16, thereby limiting the angular range of rotation of the collar 10 (FIGS. 3 and 4). A groove 20 is formed in the outer circumferential surface of the tube 5 in order for the projection 11 to engage therein when the tube 5 is rotated into its properly connected position, as shown in FIG. 4.

Connection of the tube 5 to the handpiece body 1 is effected in the following manner: First, the rear end of the tube 5 with a dental tool 6 is inserted into the outer connection tube 4 and then rotated until the pin 12 is engaged into one of the slots 7. Upon further rotation, counter clockwise in FIGS. 3 and 4, of the tube 5, the pin-and-slot connection causes the collar to be rotated until the edge portion 13 thereof snap-fits into the recess 15 and the pin 17 abuts on the face 19 of the recess 16, thereby locking the collar 10 and the tube 5 in the position. Since the outer circumferential surface of the collar 10 is eccentric with respect to that of the support tube 5, as the tube 5 and collar 10 are rotated, the inner surface of the collar is moved toward the outer surface of the tube 5 until the projection 11 on the latter comes to engage in the groove 20 in the former. Under the condition, the support tube 5 with the tool 6 cannot accidentally be pulled out of the connection tube 4.

For separation of the tube 5 from the handpiece body 1, the tube 5 may be rotated in the opposite direction, that is, clockwise in FIG. 4 and with such a force that the edge portion 13 of the collar 10 may ride over the slope 21 of the recess 15 until the tube 5 is separable from the collar 10. Then the tube 5 with the tool 6 may be simply pulled out.

For rotation of the tool for use in dental treatment, the body 1 encloses a rotatable shaft A driven by a motor not shown, and the tool 6 has its rear end B engageable with the forward end of the shaft A for drive connection.

What I claim is:

1. A dental handpiece attached to a rotary drive means, said handpiece comprising:
   a hollow cylindrical body having one portion of its bore eccentric;
   a tool member comprising an outer tubular element and a rotatively mounted tool drive means disposed within said tubular element, said tool member having one end adapted to be inserted into said body with said rotatively mounted tool drive means engaging said rotary drive means;
   an eccentric collar having an inner diameter exceeding the outer diameter of said tubular element, said collar disposed within said eccentric bore portion, and;
   means to engage said collar with said tubular element to prevent relative rotation therebetween so that as said tubular member is inserted into said body and collar and rotated relative to said body, said collar firmly engages said tubular element for secure connection of said tool member to said cylindrical body.

2. The dental handpiece of claim 1 wherein said collar is made of a resilient material and has an inwardly extending projection on the inner surface of said collar and wherein said tool member is provided with a groove circumferentially extending around the outer surface thereof to engage said projection when said handpiece is assembled.

3. The dental handpiece of claim 2 wherein said collar is discontinuous forming a pair of opposed edge portions across the discontinuity; said body being formed with a recess to engage one of said pair of opposed edge portions to inhibit relative rotation of said body and said collar.

4. The dental handpiece of claim 2, wherein said collar is formed on its one end face with an axially directed recess defined by an opposed pair of faces, and said cylindrical body is provided with a member projecting into said recess so as to be selectively engageable with said opposite faces as said collar is rotated, thereby limiting the angle of rotation of said collar with respect to said cylindrical body.

References Cited

UNITED STATES PATENTS 1,747,947   2/1930   Pannwitz _____ 32—26

ROBERT PESHOCK, Primary Examiner